United States Patent [19]

Ishizaka

[11] 4,005,185

[45] Jan. 25, 1977

[54] METHOD FOR HYDROGEN GENERATION

[76] Inventor: Otaharu Ishizaka, c/o Tohwa-mansion No. 1303, 12-12 Hohman 2-chome, Suginami, Tokyo, Japan

[22] Filed: Apr. 10, 1974

[21] Appl. No.: 459,723

[52] U.S. Cl. .................. 423/648; 423/413; 423/420

[51] Int. Cl.² .................. C01B 1/02; C01B 1/07; C01C 1/00; C01B 21/00

[58] Field of Search .......... 423/648, 657, 658, 413, 423/420

[56] References Cited

UNITED STATES PATENTS

| 515,500 | 2/1894 | Nobel | 423/648 |
|---|---|---|---|
| 1,059,818 | 4/1913 | Bergius | 423/648 |
| 2,623,812 | 12/1952 | Eborall et al. | 423/657 |
| 3,348,919 | 10/1967 | Shumway | 423/657 |

FOREIGN PATENTS OR APPLICATIONS

| 9,773 | 1885 | United Kingdom | 423/648 |

*Primary Examiner*—Edward Stern
*Attorney, Agent, or Firm*—Armstrong, Nikaido & Wegner

[57] ABSTRACT

A method for generating hydrogen. Metallic zinc or metallic zinc coated with a film of a dissimilar metal, a dissimiliar metal oxide, or a dissimiliar metal oxide complex is contacted through the medium of an aqueous solution of (i) neutral ammonium carbonate, (ii) neutral ammonium carbonate and an ammonium salt of an inorganic acid, (iii) an ammonium salt of an inorganic acid and ammonia water, or (iv) neutral ammonium carbonate, an ammonium salt of an inorganic acid and ammonia water with an ammonium complex salt of a metal other than zinc.

9 Claims, 1 Drawing Figure

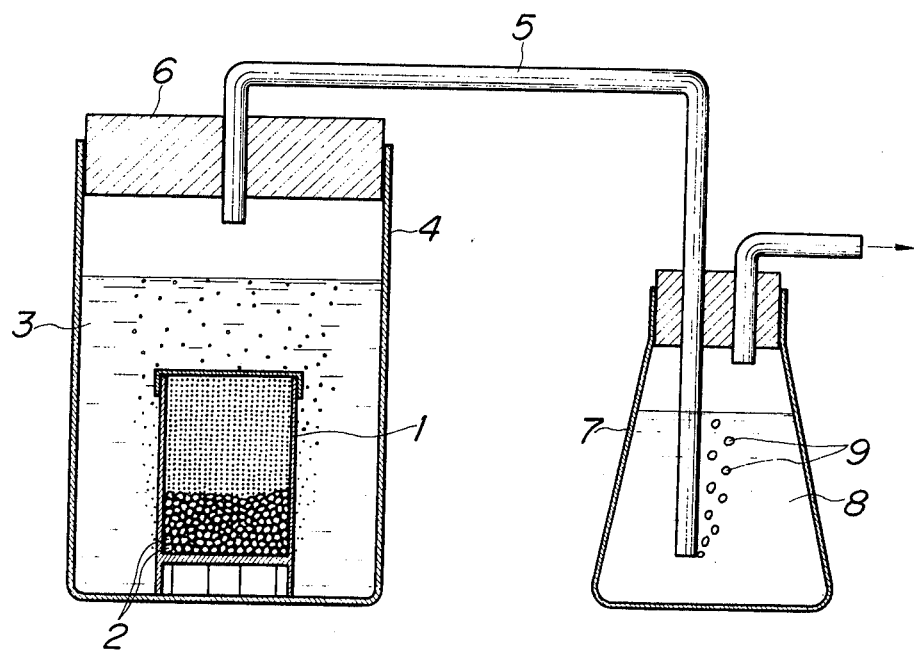

METHOD FOR HYDROGEN GENERATION

BACKGROUND OF THE INVENTION

The present invention relates to a method for hydrogen generation, particularly to a method of generating hydrogen from water through the exploitation of a short-term decomposition that is stable, durable and efficient and that is characterized by low heat generation and the possibility of reclamation of ammonium complex salt through the addition of water to the reaction medium.

Atomic power and petroleum fuel are currently deemed to be the best sources of heat energy, but their resources are limited. Moreover, they are also the source of public hazards such as atmospheric pollution, the elimination of which is very difficult.

In the future it is likely that public attention will be focused on the utilization of hydrogen as a source of heat energy which is relatively free from public hazard.

The problem, however, is how to safely, efficiently and economically, and with the recycling of resources other than water, generate the hydrogen.

It is an object, therefore, of the present invention to provide a method of generating hydrogen characterized in that the method produces less heat of formation than conventional methods, is safe, economical and enables the recycling of resources other than water.

SUMMARY OF THE INVENTION

The foregoing object is accomplished, according to the present invention by providing a method for generating hydrogen by contacting a. metallic zinc or metallic zinc coated with a film of a dissimilar metal, a dissimiliar metal oxide, or a dissimiliar metal oxide complex with b. an ammonium complex salt of a metal other than zinc through the medium of c. an aqueous solution of
   i. neutral ammonium carbonate (($NH_4$)$_2CO_3$),
   ii. neutral ammonium carbonate and an ammonium salt of an inorganic acid,
   iii. an ammonium salt of an inorganic acid and ammonia water, or
   iv. neutral ammonium carbonate, an ammonium salt of an inorganic acid and ammonia water.

The present invention and its features or advantages will be more exactly understood by referring to the following detailed description of the invention with reference to the attached drawing.

BRIEF DESCRIPTION OF THE DRAWING

The drawing illustrates a hydrogen-generating device embodying the present invention.

DETAILED DESCRIPTION

The ammonium complex salts according to the invention are those formed during the dissolution of a suitable metal in an aqueous solution of neutral ammonium carbonate, or of neutral ammonium carbonate and an ammonium salt of an inorganic acid, or of an ammonium salt of an inorganic acid and ammonia water, or of neutral ammonium carbonate, an ammonium salt of an inorganic acid and ammonia water. Neutral ammonium carbonate as used herein indicates ($NH_4$)$_2CO_3$ and is used to distinguish the ammonium carbonate from ($NH_4$)$HCO_3$.

As the ammonium salt of an inorganic acid, ammonium chloride is advantageously used in the method of the invention, although ammonium salts of other mono-, di- aNd tri-basic acids may be employed.

The terminology "ammonia water" is generally used herein in lieu of "ammonium hydroxide", $NH_4OH$, since, as it is well known, ammonium hydroxide is crystalline only at sub-zero temperatures and is otherwise only known in solution as ammonia water.

Ammonium complex salts useful in the invention are those of metals capable of forming ammine coordinate complex salts under the conditions of the method of the invention, i.e., in the aqueous medium, since it appears that the mechanism of hydrogen generation relates to the formation of these ammine coordinated complex salts from the ammonium salts in the aqueous medium.

An ammine coordinated complex salt is obtained with $NH_3$ as the coordination factor. An organic ammine system is also possible, but for economic reasons, $NH_3$ alone is utilized.

From most metals an ammine complex salt can be obtained by exposing their halides to dry ammonia gas or to liquid ammonia; in the case of transition metals an aqueous solution of a salt is treated with ammonia.

Among the ammine complex salts, the hexammine complex salts of cobalt(II), iron(II) and aluminum(III), tetrammines of copper and zinc(II), or ammines of alkali metals and alkaline earth metals are alkaline and can be easily decomposed. Thus these metals are advantageously employed for forming the ammonium complex salts of the invention.

Typical ammine-coordinated complex salts found in the method of the invention are listed in Table 1, using a general formula.

Table 1

| | |
|---|---|
| [$M^I$ ($NH_3$)$_2$]X | $M^I$=Li, Na, K, Cu |
| [$M^{IV}$ ($NH_3$)$_4$]$X_4$ | $M^{IV}$=Ti |
| [$M^{II}$ ($NH_3$)$_6$]$X_2$ | $M^{II}$=Be, Mg, Ca, Zn, Cd, Cu, Mn, Fe, Co, Ni |
| [$M^{III}$ ($NH_3$)$_6$]$X_3$ | $M^{III}$=Al, Cr |

In the table X, $X_2$, $X_3$ and $X_4$ are representative of mono-, di- or tri-basic acid residues such as $Cl^-$ and of $OH^-$ or $HCO_3^-$ radicals.

Metallic zinc is used in the method of the invention, preferably in the form of zinc grains. Metallic zinc coated with a film of a dissimilar metal, which may be in the form of its oxide or its oxide complex is also useful in the invention and may be used in combination with the metallic zinc. By dissimilar metal is meant any metal other than zinc. The metals most useful for the formation of the ammonium complex salts are particularly suitable as the dissimilar metal coating for the zinc.

A concentration of the ammonium complex salt in the aqueous medium solution of from 5 to 40% of that of the concentration of ammonium carbonate, ammonium salt and ammonia water in the medium solution has been found to be particularly advantageous in the method of the invention. The concentration of the ammonium complex salt is of course limited to saturation of the solution. The optimum concentration of ammonium carbonate, ammonium salt or ammonia water or of a combination of these in the aqueous medium is from 10 to 20% by weight based on the weight of the aqueous solution. The pH of the solution should be maintained alkaline.

Combinations of metal (M), inorganic acid salt of metal (MX), inorganic acid salt of ammonium (Aa), ammonia water (AW), and aqueous solution of ammonium carbonate (ACW) with the metal Zn which generate hydrogen may be illustrated as follows:

$\|Zn|Aa + AW|M\|$  1.

$\|Zn|Aa + ACW|M\|$  2.

$\|Zn|ACW|M\|$  3.

$\|Zn|MX + AW \text{ or } ACW\|$  4.

$\|Zn|MX + AW \text{ or } ACW|M\|$  5.

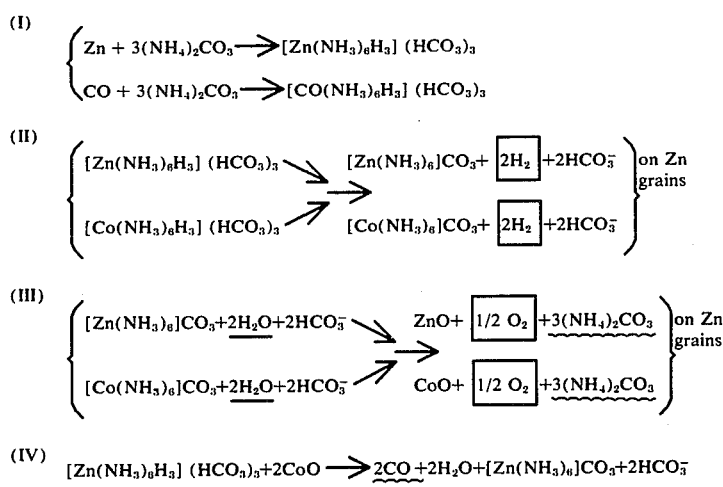

(IV) $[Zn(NH_3)_6H_3](HCO_3)_3 + 2CoO \longrightarrow \underline{2Co} + 2H_2O + [Zn(NH_3)_6]CO_3 + 2HCO_3^-$ With these combinations there is no direct contact between Zn and M — they react with each other through a solvent.

Direct contact between the two metals is tolerable, but experimental data show that such contact is not justified from a standpoint of reaction durability.

According to experimental data, the combinations (1), (2), and (3) are recommendable from a standpoint of long duration of reaction; the combination (4) is found favorable for the generation of a large volume of hydrogen at a time. The combination (5) is inefficient and is impractical.

The method of the invention may be illustrated more precisely by referring to the drawing in conjunction with the following description: 0.1g of Co was placed into a 10% $(NH_4)_2CO_3$ aqueous solution (50ml) and after standing two hours a very small value of Co is dissolved, yielding an aqueous solution tinted with rose-red with no foaming recognized. (Solution of ammonium Co II complex salt is purplish rose-red and of ammine Co II complex salt is rose-red).

Five grams of Zn grains 2 was placed in a porous glass vessel 1 as illustrated. Said porous glass vessel 1 was dipped into a glass vessel 4 which was filled with 25ml of the above-described 10% $(NH_4)_2CO_3$ aqueous solution 3 containing the Co complex salt. Said glass vessel 4 was sealed with a lid 6 equipped with a gas discharge pipe 5. When the volume of discharged gas was measured, abundant generation of $H_2$ was recognizable.

In the drawing, the numeral 7 represents a glass vessel holding soap suds 8; the tip of said gas discharge pipe 5 is submerged in the soap suds 8; hydrogen bubbles 9 are discharged out of the gas discharge pipe 5.

Similar test with Cu, Ni and Fe produced the same results.

The following illustrative theoretical formulas which will be discussed more fully below were derived from experiments such as the foregoing under the combinations 1 – 5.

wherein ☐ gas discharged,—–reclaimed,——water added

Through repetition of the reactions represented by I-IV $H_2$ is continuously generated.

As ZnO and metal oxides precipitate — and particularly as the surface of Zn grains become deposited with ZnO — the velocity of reaction in the direction of $H_2$ generation drops tending toward equilibrium with a steady decrease in the generation of $H_2$.

Based upon the above theory, several examples are cited to help anyone skilled in the art execute the present invention.

It should be noted, however, that these examples are not exhaustive and the present invention permits other modifications within the scope of the description in the present specification and the scope of the appended claims.

In the examples the device employed was a device equivalent to that shown in the drawing.

EXAMPLE 1

Results of experiments under the combination $\|Zn|Co\ (NH_4)_2CO_3\ H_2O\|$ are given. 30ml of Co $-(NH_4)_2CO_3\cdot H_2O$ solution (containing 50μg of $Co^{2+}$ and 2g of $(NH_4)_2\ CO_3H_2O$) was charged over 15g of Zn grains. The hydrogen generation is tabulated in Table 2.

Table 2

| Time | | | | Temperature 22° C | | |
|---|---|---|---|---|---|---|
| | 5' | 15' | 35' | 1 hr | 2 hr 15' | 3hr35' |
| $H_2$ generation (ml/min.) | 5 | 7 | 6.8 | 3.8 | 2.4 | 1.8 |

Zn consumption = 0.2g (in 10 hours)

Zn consumption = 0.2g (in 10 hours)

The surface of Zn was deposited with gray-greenish brown CoO. White precipitation of ZnO also appeared. Thereupon the solution was replaced with 30ml of aqueous solution containing 3g of $(NH_4)_2CO_3 \cdot H_2O$ and the experiment was resumed. Hydrogen generation is tabulated in Table 3.

Table 3

| Time | Temperature 22° C | | | | |
|---|---|---|---|---|---|
| | 20' | 35' | 1hr19' | 2hr34' | 3hr27' |
| $H_2$ generation(ml/min.) | 0.3 | 2.2 | 3.0 | 2.3 | 1.7 |
| 4hr27' | 5hr14' | 6hr7' | 7hr34' | 8hr22' | 9hr41' | 10hr14' |
| 1.4 | 1.3 | 1.1 | 0.9 | 0.8 | 0.7 | 0.8 |

The solution was almost colorless with precipitation of ZnO.

Total generation of $H_2$=1l, Zn consumption=1.1g

Hydrogen generation of one theoretical mol corresponds to consumption of about 1/2.5 mol of Zn.

Results of duplicated tests show that $H_2$ generation of one theoretical mol corresponds to a consumption of 1/2.5 – 1/3 mol of Zn. Thus, Zn(1 mol) → $H_2$ (containing a trace of $O_2$ (2.5 – 3 mols)).

EXAMPLE 2

The present example refers to the combination $\|Zn\,|\,(NH_4)_2CO_3\,|\,Cu\|$

The device as illustrated in the drawing was used, but the porous vessel 1 was made of aluminum.

Ten grams of Zn grains were placed in the aluminum vessel and 0.55 g of Cu coil was placed at the bottom of the glass vessel so as not to touch this vessel; 50ml of a solution containing 5g of $(NH_4)_2CO_3 \cdot H_2O$ was employed. Hydrogen generation is shown in Table 4.

Table 4

| Time | Temperatures 20° C – 32° C | | | | | |
|---|---|---|---|---|---|---|
| | 34' | 47' | 1hr | 1hr16' | 1hr29' | 2hr |
| $H_2$ generation(ml/min.) | 0.4 | 0.5 | 0.8 | 0.8 | 0.9 | 1.0 |
| 3hr11' | 4hr44' | 5hr16' | 6hr54' | 7hr10' | 8hr1' | 9hr14' |
| 1.2 | 1.4 | 1.3 | 1.4 | 1.4 | 1.4 | 1.2 |
| 10hr22' | 11hr2' | 12hr1' | 12hr35' | 13hr50' | 18hr13' | 20hr13' |
| 1.1 | 1.1 | 1.0 | 1.1 | 0.9 | 0.6 | 0.5 |
| 21hr14' | 22hr10' | 22hr26' | 24hr | 24hr40' | 25hr1' | 25hr28' |
| 0.6 | 0.9 | 1.0 | 1.0 | 1.0 | 1.1 | 1.2 |
| 26hr11' | 27hr14' | 27hr26' | | | | |
| 0.8 | 0.8 | 0.7 | | | | |

The solution was almost colorless with ZnO precipitated and on the Zn grains, a brown CuO precipitated.

Total generation of $H_2$ = 1.6l, Zn consumption = 1.4g

Thus Zn (1 mol) → $H_2$ (containing a trace of $O_2$) 3 mols generated.

The same phenomenon as in Example 1 occurred when the solution was replaced with fresh $(NH_4)_2CO_3$.

EXAMPLE 3

This example refers to the combination $\|Zn\,|\,(NH_4)_2CO_3\,|\,Fe\|$ .

The porous vessel employed was an aluminum one.

The Al porous vessel was filled with 12.7g of Zn grains (some part was fresh Zn and the greater part was old Zn grains coated with FeO). A solution of 5g of $(NH_4)_2CO_3$ in 50ml of water was used as the aqueous medium. Hydrogen generation is shown in Table 5.

Table 5

| Time | Temperatures 22° C – 32° C | | | | | |
|---|---|---|---|---|---|---|
| | 5' | 9' | 30' | 1hr | 1hr30' | 2hr |
| $H_2$ generation (ml/min) | 0 | 0.5 | 2.0 | 2.0 | 1.8 | 1.8 |
| 2hr30' | 3hr | 4hr | 5hr | 5hr9' | 6hr | 7hr | 7hr30' | 10hr15' |
| 1.8 | 1.8 | 1.8 | 1.9 | 1.5 | 1.6 | 1.6 | 1.2 | 0.9 |

Total generation of $H_2$ = 0.9l, Zn consumption = 1.6g

Thus Zn (1 mol) → $H_2$ (containing a trace of $O_2$) 1.6 mols generated.

Introduction of fresh Zn grains seems to result in a heavy consumption of Zn.

The surface of Zn grains was coated with FeO.

Inserting into a small plastic bottle an Al porous vessel holding 30g of FeO-coated Zn grains and using the same device as illustrated, a duplicate test was made. The aqueous medium comprised 3g of $(NH_4)_2CO_3$ dissolved in 25ml of water. Hydrogen generation is tabulated in Table 6.

Table 6

| Time | Temperatures 19° C – 24° C | | | | | |
|---|---|---|---|---|---|---|
| | 11' | 23' | 51' | 1hr | 2hr11' | 2hr51' |
| $H_2$ generation (ml/min) | 1.2 | 1.3 | 1.4 | 1.6 | 1.4 | 1.3 |
| 3hr35' | 6hr51' | 8hr51' | 10hr21' | 10hr41' | 11hr12' | 13hr8' |
| 1.3 | 1.3 | 1.2 | 1.2 | 1.2 | 1.2 | 1.4 |
| 14hr3' | 15hr21' | 18hr22' | 21hr51' | 23hr36' | | |
| 1.4 | 1.0 | 0.9 | 0.5 | 0.5 | | |

Total generation of $H_2$ = 1.38l, Zn consumption = 0.1g or less.

Thus Zn (1 mol) → $H_2$ (containing a trace of $O_2$) more than 36 mols produced.

These results are considered to be excellent.

EXAMPLE 4

The combination in this case was 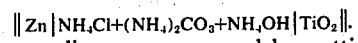$\|Zn|(NH_4)_2CO_3|Ni\|$.

The device as illustrated was used. The Al porous vessel was filled with 10g of fresh Zn grains; and, as the aqueous medium, a solution of 5g of $(NH_4)_2CO_3$ in 50ml $H_2O$. 0.1g of Ni metal powder was poured at the bottom of the glass vessel. Ni consumption remained in the order of $\mu g$.

Table 7

| Time | | | | Temperatures 20° C - 31° C | | |
|---|---|---|---|---|---|---|
| | 8' | 37' | 1hr | 1hr26' | 2hr26' | |
| $H_2$ generation (ml/min) | 0.1 | 0.2 | 0.4 | 0.8 | 0.8 | |
| 3hr36' | 7hr26' | 10hr23' | 11hr11' | 12hr21' | 13hr | 14hr |
| 0.9 | 0.8 | 0.8 | 0.7 | 0.8 | 0.9 | 1.4 |
| 15hr | 16hr | 18hr | 18hr17' | | | |
| 1.4 | 1.4 | 1.2 | 1.0 | | | |

Total generation of $H_2$ = 1l, Zn consumption = 0.8g

Thus Zn (1 mol) → $H_2$ (contains a trace of $O_2$) 3.4 mols generated.

EXAMPLE 5

The combination in this case was

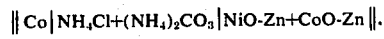$\|Co|NH_4Cl+(NH_4)_2CO_3|NiO\text{-}Zn+CoO\text{-}Zn\|$.

The Al porous vessel was filled with layers of NiO-coated Zn grains (5g) and CoO-coated Zn grains (5g). The medium was a solution of 0.5g of $NH_4Cl$ and 5g of $(NH_4)_2CO_3$ in 50 ml of $H_2O$. 0.1g of metallic Co powder was poured at the bottom.

Co consumption remained in the order of $\mu g$. Hydrogen generation is tabulated in Table 8.

Table 8

| Time | | | Temperatures 20° C - 23° C | | |
|---|---|---|---|---|---|
| | 10' | 18' | 43' | 1hr33' | 2hr23' |
| $H_2$ generation (ml/min) | 3.6 | 4.4 | 3.4 | 2.4 | 1.8 |
| 4hr48' | 7hr39' | 8hr50' | 10hr3' | 11hr8' | |
| 1.0 | 0.8 | 0.8 | 0.8 | 1.1 | |

Total generation of $H_2$ = 1.5l, Zn consumption = 1.2g

Thus Zn (1 mol) → $H_2$ (containing a trace of $O_2$) 3.3 mols generated.

Co dissolves fast in the solvent; and $H_2$ generation is initially fast. In the case of Ni, $H_2$ generation is fast in the latter half period. Therefore combination of Co and Ni with Zn seems to give a relatively high efficiency.

Also solvent combination of $NH_4Cl$ and $(NH_4)_2CO_3$ seems to be highly effective.

EXAMPLE 6

The combination in this case is $\|Zn|NH_4Cl+(NH_4)_2CO_3+NH_4OH|TiO_2\|$.

The medium was prepared by putting 0.2g of $TiO_2$ powder at the bottom of a glass bottle filled with a solution of 0.5g of $NH_4Cl$, 5g of $(NH_4)_2CO_3$ and 0.25 ml of 28% $NH_3$ water in 50 ml of $H_2O$. Into this medium an Al porous vessel filled with fresh Zn grains (5g) was inserted. Hydrogen generation is tabulated in Table 9.

Table 9

| Time | | Temperatures 20° C - 24° C | | | |
|---|---|---|---|---|---|
| | 2hr | 2hr35' | 3hr30' | 4hr30' | 5hr40' |
| $H_2$ generation (ml/min) | 0.2 | 0.5 | 0.8 | 0.9 | 0.8 |
| 7hr | 9hr | 10hr25' | 14hr30' | 17hr40' | 19hr | 20hr |
| 1.0 | 0.9 | 0.8 | 0.8 | 0.5 | 0.6 | 0.5 |

Total generation of $H_2$ = 0.7l, Zn consumption = 1.0g

Thus Zn (1 mol) → $H_2$ (containing a trace of $O_2$) 3.3 mols generated.

Seemingly it took time for Ti-ammonium complex salt to be formed from $TiO_2$, but once the complex salt was formed, $H_2$ generation began just as in the above example.

EXAMPLE 7

This is the case of combination $\|Zn|NH_4Cl+(NH_4)_2CO_3+NH_4OH|MgO.MgHCO_3\|$.

A small plastic vessel as shown in the drawing was used.

The medium was prepared by putting 0.2g of magnesium powder at the bottom of a plastic bottle filled with a solution of 0.5g of $NH_4Cl$, 3g of $(NH_4)_2CO_3$, and 0.13 ml of 28% $NH_3$ water in 30 ml of $H_2O$. Into this medium a plastic porous vessel filled with fresh Zn grains (5g) was inserted. Hydrogen generation is tabulated in Table 10.

Table 10

| Time | | Temperatures 22° C - 24° C | | | |
|---|---|---|---|---|---|
| | 17' | 2hr45' | 5hr30' | 5hr50' | 6hr45' |
| $H_2$ generation (ml/min) | 0.1 | 0.4 | 0.6 | 0.6 | 0.6 |
| 8hr | 9hr | 9hr40' | 10hr40' | 11hr30' | 12hr30' | 13hr30' |
| 0.6 | 0.8 | 0.7 | 0.6 | 0.8 | 0.6 | 0.6 |
| 14hr40' | 15hr45' | 16hr45' | 18hr | | | |

Table 10-continued

| | | Temperatures 22° C – 24° C | | |
|---|---|---|---|---|
| 0.5 | 0.5 | 0.5 | 0.4 | |

Total generation of $H_2$ = 0.5l, Zn consumption = 0.4g

Thus Zn (1 mol) → $H_2$ (containing a trace of $O_2$) 3.5 mols generated.

Tests were repeated with addition of 3g of $(NH_4)_2CO_3$. Hydrogen generation is shown in Table 11.

Table 11

| | Temperatures 19° C – 24° C | | | | |
|---|---|---|---|---|---|
| Time | 4' | 16' | 1hr6' | 3hr12' | 4hr40' |
| $H_2$ generation (ml/min) | 1.6 | 1.8 | 1.6 | 1.3 | 1.1 |
| 7hr10' | 12hr | 13hr | 14hr6' | 15hr | |
| 0.9 | 0.7 | 0.6 | 0.7 | 0.7 | |

Total generation of $H_2$ = 0.9l, Zn consumption = 1.5g

Thus Zn (1 mol) → $H_2$ (containing a trace of $O_2$) 1.6 mols generated.

plastic bottle filled with said medium. Hydrogen generation is shown in the Table 12.

Table 12

| | Temperatures 22° C – 24° C | | | | |
|---|---|---|---|---|---|
| Time | 1hr3' | 1hr20' | 2hr | 2hr50' | 3hr4' |
| $H_2$ generation (ml/min) | 0.2 | 0.2 | 0.3 | 0.5 | 0.6 |
| 3hr40' | 4hr20' | 5hr10' | 5hr30' | 6hr | 6hr40' |
| 0.6 | 0.8 | 0.7 | 0.7 | 0.7 | 0.7 |

Total generation of $H_2$ = 0.16l, Zn consumption = 0.1g or less

Thus Zn (1 mol) → $H_2$ (containing a trace of $O_2$) over 4.3 mols generated.

The process was ideally good, but the $H_2$ generation turned out limited. Therefore with additional dissolution of 3g of $(NH_4)_2CO_3$, the experiment was continued. Hydrogen generation is tabulated in Table 13.

Table 13

| | Temperatures 19° C – 23° C | | | | |
|---|---|---|---|---|---|
| Time | 1' | 7' | 22' | 42' | 1hr16' | 1hr47' |
| $H_2$ generation (ml/min) | 1.3 | 2.1 | 2.2 | 2.2 | 2.8 | 2.4 |
| 2hr52' | 4hr17' | 5hr57' | 9hr12' | 11hr37' | 13hr7' | 14hr |
| 2.4 | 2.2 | 1.9 | 1.3 | 0.9 | 1.1 | 1.0 |

Total generation of $H_2$ = 1.5l, Zn consumption = 2.2g

EXAMPLE 8

This is the case of combination $\|Zn|NH_4Cl+(NH_4)_2CO_3+NH_4OH|NaCl\|$.

As the result of the above-mentioned decomposition of alkaline earth-coordinated complex salt, $H_2$ was generated.

Therefore, taking NaCl as a typical alkaline salt, tests were repeated. The vessels used were plastic-made just as in the preceding example.

The medium was prepared by dissolving 0.3g of NaCl in a solution of 0.2g of $NH_4Cl$, 3g of $(NH_4)_2CO_3$, and 0.25 ml of 28% $NH_3$ water in 30 ml. of $H_2O$. A plastic vessel filled with Zn grains (10g) was introduced into a Thus Zn 1 mol → $H_2$ (containing a trace of $O_2$) 1.8 mols generated.

The $H_2$ generation was nearly true to theory, but the economy of $H_2$ generation relative to Zn was not good. In this respect much can be expected from recipe improvement.

Based on the results of these examples, studies were made of combinations of various metals with Zn, consumption of metal ratio of Zn, combinations and ratios of $NH_4OH, NH_4Cl$ and $(NH_4)_2CO_3$ in the medium solution, and concentration and quantity of medium solution relative to metal. As the result of these studies, the following theoretical formulas and additional observations have been formulated:

As general formulas for six-coordinated substance (I)
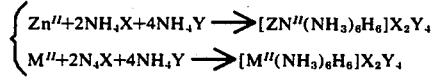

(II)
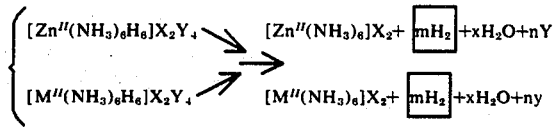

-continued

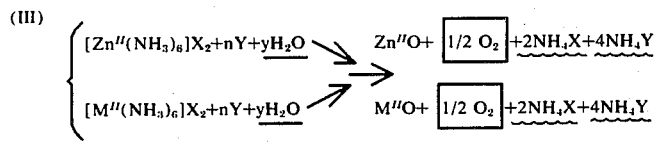

(IV) 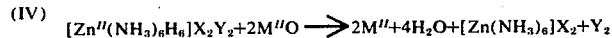

Reactions I – IV are repetitive. Reactions II – IV take place on the surface of Zn grains. ☐ denotes gas generation; ⤳ reclamation and — addition of water. In the above formulas $m$, $n$ and $y$ depend on the conditions such as concentration and combination of reagents and equipment employed; X denotes mono basic acid residue and Y denotes $OH^-$ or $HCO_3^-$ radical.

Additional observations are as follows:

$H_2$ generation takes place in the course of ammine complex salt being formed from ammonium complex salt of metal. Depending on the reacting conditions, 3 mols – 1.5 mols of $H_2$ can be generated using 1 mol Zn; but the generation may exceed 3 mols under the condition of oxidation of Zn being inhibited.

The above-mentioned general formulas referring to 6-coordinated substances may be applied to 1 – 4 or 8-coordinated substances.

A medium of $NH_4Cl$ combined with $(NH_4)_2CO_3$ in aqueous solution is the most commonplace. A combination of $NH_4Cl$ and $NH_4OH$ is inconvenient for use because of precipitation of metal hydroxide or generation of $NH_3$.

The easier to dissolve in the medium the metal is, the sooner $H_2$ can be generated. The harder to dissolve in the medium the metal is, the later $H_2$ generation occurs, but in this case once the generation is started, the slowdown of its rate with time passage is less remarkable.

The greater the volume and surface area of Zn, the more effective. Meanwhile the greater the volume of the aqueous medium, the better the generation.

The higher the concentration of the aqueous medium, the better — the optimum concentration being 10 – 20%.

The reaction temperature is desirably 10° C – 40° C and more desirably 20° C – 35° C. The higher the temperature, the more efficient is the $H_2$ generation, but it is accompanied with a slight increase in volatilization of $NH_3$. The more porous the vessel for Zn, the better effect. From this standpoint plastic is the desirable material, but use of glass or aluminum is tolerated. The dissimilar metal should desirably be fine coil instead of powder and its dissolubility should be minimized. It is advantageous to keep the fine wire out of direct contact with Zn.

$(NH_4)_2CO_3$ is required to be of high purity, but it may be substituted by ammonia water with $CO_2$ gas introduced therein. Acidic ammonium carbonate, however, is useless.

There is a slight volume of $NH_3$ generated as side product, but this can be eliminated by flushing with water through ion-exchange resin.

When a massive generation of $H_2$ at a time is needed, a concentrated aqueous solution of ammonium carbonate containing preliminarily a small volume of ammonium complex salt of a dissimilar metal will be highly effective.

The combination of a chloride or sulfate of an alkali metal or of an alkaline earth metal with metallic Zn dissolved in an aqueous solution of $NH_4Cl$ and $(NH_4)_2CO_3$ will be notably effective for prevention of ZnO film formation, because under this combination the ammine complex salt of such metal can be easily decomposed. This combination is also favorable for continuously long generation of $H_2$ and is most economical.

The modern internal combustion engine which relies on the heat energy and pressure due to irreversible combustion and explosion of gasoline is associated with over-heating and, as well-known, air pollution due to emissions of incomplete combustion products. Heat energy and pressure obtained through ignition and explosion of hydrogen generated according to the present invention and oxygen existing in the atmosphere can be substituted for gasoline to be burned in the internal combustion engine of automobiles, aircraft and ships, without any public hazard or emissions, because it generates only $H_2O$.

Zn and ammonium salts are relatively inexpensive and industrially reclaimable, which make them recommendable from a standpoint of resource conservation.

Thus the $H_2$ generation method according to the present invention may be called a very useful method for securing a heat energy source which is recommendable both for the purpose of resource conservation and as a countermeasure for public hazards. Being safe for operation, it will be of great practical significance.

What is claimed is:

1. A method for generating hydrogen comprising contacting
   a. metallic zinc with
   b. an ammonium-complex salt of a metal other than zinc in an aqueous solution maintained under alkaline conditions of a member selected from the group consisting of:
      i. neutral ammonium carbonate $((NH_4)_2CO_3)$,
      ii. neutral ammonium carbonate and an ammonium salt of an inorganic acid,
      iii. an ammonium salt of an inorganic acid and ammonia water, and
      iv. neutral ammonium carbonate, an ammonium salt of an inorganic acid and ammonia water and at a reaction temperature of from about 10° to 40° C, whereby hydrogen is generated through the transformation of the ammonium salt of the metal other than zinc into an ammine coordinated complex salt of the metal other than zinc.

2. The method of claim 1 wherein the ammonium complex salt of a metal other than zinc is formed by dissolving said metal other than zinc in the aqueous solution.

3. The method of claim 1 wherein the concentration of ammonium complex salt in the aqueous solution is about 5 to 40% of the concentration of the ammonium carbonate in the solution.

4. The method of claim 1 wherein the aqueous solution is an aqueous solution of ammonium chloride and neutral ammonium carbonate.

5. The method of claim 1 wherein the metal other than zinc is lithium, sodium, potassium, copper, titanium, beryllium, magnesium, cadmium, manganese, iron, cobalt, nickel, aluminum or chromium.

6. The method of claim 1 wherein the ammonium complex salt of a metal other than zinc is formed by adding a chloride of said metal to the aqueous solution.

7. The method of claim 1 wherein the ammonium complex salt of a metal other than zinc is formed by adding a sulfate of said metal to the aqueous solution.

8. The method of claim 1 wherein the rate of hydrogen generation is controlled by varying the concentration of (i), (ii), (iii), or (iv) in said aqueous solution.

9. A method for generating hydrogen comprising contacting metallic zinc with an ammonium complex salt of a metal other than zinc in an aqueous solution maintained under alkaline conditions of an ammonium salt of an inorganic acid and ammonia water and at a reaction temperature of from about 10° to 40° C whereby hydrogen is generated through the transformation of the ammonium complex salt of the metal other than zinc into an ammine coordinated complex salt of the metal other than zinc.

* * * * *